United States Patent
Nakajima et al.

(10) Patent No.: US 8,223,772 B2
(45) Date of Patent: Jul. 17, 2012

(54) CLOCK SUPPLY DEVICE AND TRANSMISSION DEVICE

(75) Inventors: Takashi Nakajima, Kawasaki (JP); Akio Morimoto, Kawasaki (JP); Kazunori Kawabe, Kawasaki (JP); Tatsuru Iwaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 258 days.

(21) Appl. No.: 12/693,436

(22) Filed: Jan. 25, 2010

(65) Prior Publication Data
US 2010/0189109 A1 Jul. 29, 2010

(30) Foreign Application Priority Data
Jan. 27, 2009 (JP) ................................ 2009-015533

(51) Int. Cl.
 *H04L 12/28* (2006.01)
(52) U.S. Cl. ..................... 370/395.1; 370/352; 370/355; 370/516
(58) Field of Classification Search .................. 370/102, 370/352, 353, 354, 355, 395.1, 503, 516
See application file for complete search history.

(56) References Cited

U.S. PATENT DOCUMENTS

| | | | | |
|---|---|---|---|---|
| 4,811,340 A * | 3/1989 | McEachern et al. | ........... | 370/505 |
| 5,742,208 A * | 4/1998 | Blazo | .............................. | 331/23 |
| 5,751,193 A * | 5/1998 | Nakajima et al. | ................. | 331/3 |
| 5,757,871 A * | 5/1998 | Furukawa et al. | ............ | 375/372 |
| 5,812,618 A * | 9/1998 | Muntz et al. | ................... | 375/372 |
| 6,300,841 B1 * | 10/2001 | Atsumi et al. | ................ | 331/94.1 |
| 6,570,455 B2 * | 5/2003 | Atsumi et al. | ..................... | 331/3 |
| 7,015,762 B1 * | 3/2006 | Nicholls et al. | ................. | 331/10 |
| 7,372,875 B2 * | 5/2008 | Hadzic et al. | .................. | 370/516 |
| 7,817,673 B2 * | 10/2010 | Scott et al. | ..................... | 370/503 |
| 2002/0125959 A1 * | 9/2002 | Atsumi et al. | ..................... | 331/3 |
| 2004/0062278 A1 * | 4/2004 | Hadzic et al. | ..................... | 370/503 |
| 2006/0056563 A1 * | 3/2006 | Aweya et al. | ................. | 375/376 |
| 2006/0109849 A1 | 5/2006 | Uchimoto et al. | | |
| 2006/0242445 A1 * | 10/2006 | Aweya et al. | ................. | 713/400 |
| 2008/0212619 A1 * | 9/2008 | Scott et al. | ..................... | 370/503 |
| 2009/0147806 A1 * | 6/2009 | Brueckheimer | ............. | 370/503 |

FOREIGN PATENT DOCUMENTS

| | | |
|---|---|---|
| JP | 2006-148822 A | 6/2006 |
| JP | 2007-235217 A | 9/2007 |
| JP | 2007-318791 A | 12/2007 |

* cited by examiner

*Primary Examiner* — Ayaz Sheikh
*Assistant Examiner* — Andrew C Lee
(74) *Attorney, Agent, or Firm* — Fujitsu Patent Center

(57) ABSTRACT

A clock supply device includes a receiving unit configured to receive frame synchronization packets from an asynchronous network and generate timing signals; a phase comparing unit configured to perform phase comparison by comparing phases of the timing signals generated by the receiving unit and clock signals generated by an internal oscillating unit; a phase variation detection unit configured to detect a frequency variation of the frame synchronization packets based on a trend of a variation amount of a phase difference that is obtained by performing a statistical process on count values obtained as a result of the phase comparison; and an oscillating frequency control unit configured to control an oscillating frequency of the internal oscillating unit when the phase variation detection unit detects the frequency variation of the frame synchronization packets.

6 Claims, 20 Drawing Sheets

CLOCK SUPPLY DEVICE AND TRANSMISSION DEVICE

CROSS-REFERENCE TO RELATED APPLICATIONS

This patent application is based upon and claims the benefit of priority of the prior Japanese Patent Application No. 2009-015533 filed on Jan. 27, 2009, the entire contents of which are incorporated herein by reference.

FIELD

The embodiments discussed herein are related to a clock supply device and a transmission device that uses the clock supply device.

BACKGROUND

In recent years, transmission devices of a synchronous network such as SDH (Synchronous Digital Hierarchy) or SONET (Synchronous Optical Network) have been connected via an IP (Internet Protocol) network which is an asynchronous transmission network. In this case, the device clock signals (clock pulses) of the transmission devices connected via the IP network are to be synchronized.

FIG. 1 is for describing an overview of a conventional transmission device and a conventional clock supply device. As illustrated in FIG. 1, an SDH transmission device 11A of station A and an SDH transmission device 11B of station B are connected via an SDH network 15 which is a synchronous network. A clock supply device 12A in station A generates clock signals (clock pulses) and supplies the clock signals to the SDH transmission device 11A, a device 13A, and a device 14A in station A.

The SDH transmission device 11A transmits and receives data with the use of the clock signals supplied from the clock supply device 12A. The clock supply device 12A is, for example, a cesium oscillator that outputs highly precise clock signals, and is positioned as the master clock of the entire SDH synchronous network.

The SDH transmission device 11B extracts clock components from data received from the SDH transmission device 11A, and supplies the clock components to a clock supply device 12B. The clock supply device 12B removes fluctuation components such as jitter components from the received clock signals; generates clock signals that are synchronized with the received clock signals; and supplies the generated clock signals as device clock signals to the SDH transmission device 11B, a device 13B, and a device 14B in station B. Thus, all of the devices in station B operate according to the same clock signals. Accordingly, all of the devices in station A and all of the devices in station B are synchronized.

With the advancement of IP networks in recent years, SDH data is packetized into IP packets for performing data transmission, i.e., IP transmission. One example of a method of synchronizing SDH transmission devices via an IP network is the adaptive synchronization method (see, for example, Japanese Laid-Open Patent Application No. 2007-235217). In the adaptive synchronization method, the devices are synchronized by reporting the difference in clock frequency between the SDH transmission device 11A and the SDH transmission device 11B, and correcting the frequencies.

FIG. 2 is for describing an overview of the adaptive synchronization method. As illustrated in FIG. 2, an IP transmission device 20A operates by receiving master clock signals from a clock supply device 21. An IP transmission device 20B receives clock control data transmitted from the IP transmission device 20A, and operates according to clock signals controlled by the clock control data.

The IP transmission device 20A compares the data received from the IP transmission device 20B via an IP network 22 with the master clock signals, detects the difference in frequency between the received data and the master clock signals, and applies the difference to the clock control signals to be transmitted to the IP transmission device 20B.

If the received data is slower than the master clock signals, the IP transmission device 20A generates cock control data for increasing the frequency, and transmits the generated clock control data to the IP transmission device 20B. If the received data is faster than the master clock signals, the IP transmission device 20A generates cock control data for decreasing the frequency, and transmits the generated clock control data to the IP transmission device 20B.

The IP transmission device 20B generates clock signals according to the received clock control data, and uses the generated clock signals as device clock signals in the IP transmission device 20B itself.

However, in the adaptive synchronization method, the frequency is adjusted by being increased or decreased, and therefore the variation range of the frequency is large. Furthermore, the transmission delay according to the IP network may vary (fluctuate) or packet loss may occur, and therefore the transmission delay may become unstable.

One example of a factor causing variations (fluctuations) in the transmission delay is a change of route in the IP network. FIG. 3 is a schematic diagram illustrating route changes in an IP network. The IP network is constituted by multiple routers (SW). The IP transmission device 20A and the IP transmission device 20B are connected via the routers SW1, SW5, and SW12, as indicated by the thick solid line. The transmission path delay is stable as long as the route is fixed in this state. However, the route may change so as to pass through the routers SW1, SW3, SW7, SW6, SW5, SW10, and SW12 as indicated by the dashed line, due to the convergence of the IP network or occasional failures in the routers. In such a case, the transmission path delay may vary.

In the adaptive synchronization method, the clock signals are periodically controlled, and therefore the quality of the clock frequency may be degraded due to variations in the transmission path delay. For this reason, in a case where the IP transmission device 20A and the IP transmission device 20B are SDH transmission devices, and the frequency variation range is large, it may be difficult to achieve synchronization among all of the devices in stations of an SDH network as described with reference to FIG. 1.

In order to solve this problem, there is the frame synchronization method for periodically transmitting frame synchronization packets that are synchronized with the master clock signals, and performing a statistical process at the device that has received the frame synchronization packets to identify clock signals that are synchronized with the master clock signals.

FIG. 4 is for describing an overview of the frame synchronization method. As illustrated in FIG. 4, an IP transmission device 25A operates by receiving master clock signals supplied from a CLK supply device 26. The IP transmission device 25A transmits packets referred to as frame synchronization packets at, for example, an 8 kHz frequency, to an IP transmission device 25B.

The IP transmission device 25B receives the frame synchronization packets. A clock frequency control unit 27 uses clock signals output from a voltage controlled crystal oscillator (VCXO) 28 included in the IP transmission device 25B to count the periods of the frame synchronization packets. When a certain number of samples are received, the clock frequency control unit 27 performs an averaging process (statistical process) to identify the clock frequency of the sending side, and controls the VCXO 28 to have a clock frequency equal to that of the sending side.

However, as illustrated in FIG. 5, the frame synchronization packets may fluctuate or packet loss may occur in the frame synchronization packets (as indicated by a dotted circle) due to convergence of the transmission path or route changes in the IP network. In this case, as illustrated in FIG. 6, the leading edge and the trailing edge of the reproduced clock signal on the receiving side (the leading edge and the trailing edge are illustrated with plural vertical lines) may change with respect to the clock signal on the sending side. Thus, it is difficult to completely compensate for fluctuations and packet losses so as to reduce the amount of jitter in the reproduced synchronized clock signals, as in the synchronization method of the SDH network illustrated in FIG. 1.

The following two points may be considered as factors causing the above problems. First, it is difficult to compensate for variations in the delay caused by route changes. Second, the VCXO 28 has a large allowable deviation.

When there are variations in the delay that are caused by route changes of the IP network transmission path, the delay time changes even though the clock frequency of the side sending the frame synchronization packets has not changed. Hence, the variation in the delay is not distinguishable from a case where the clock frequency has actually changed. Consequently, the output clock signals include many jitter components. Furthermore, a large number of samples (amount of data) is to be used for eliminating the impact of fluctuations in the IP network transmission path. However, it is time consuming to obtain a large number of samples.

In the frame synchronization method, the results of the averaging process are applied to the control signals for the VCXO 28. Thus, if the frequency variation is large in the VCXO 28 being used, the sample data acquired with the clock signals output from the VCXO 28 may have low precision. If such sample data having low precision is used, the difference in the clock phase between receiving side and the sending side may increase. Conversely, if the sample data is acquired at smaller intervals and the results are applied to the control voltage for the VCXO 28, the clock signals may be affected by fluctuations and packet losses in the transmission path of the IP network, and the clock signals may include many jitter components.

Now, a description is given of a PLL (phase locked loop) circuit. PLL is a circuit method of comparing the clock input phase and the VCXO output phase that are to be synchronized, implementing control so that the phases become equal, and locking the input phase and the output phase.

FIG. 7 is a block diagram of PLL. As illustrated in FIG. 7, a clock input unit 31 outputs clock signals (for example, at an 8 kHz frequency) that are targets of synchronization. The frequency of a VCXO 34 is divided by a frequency dividing circuit 35 so that clock signals are adjusted to an 8 kHz frequency. A phase comparing unit 32 compares the clock signals from the clock input unit 31 and the clock signals from the frequency dividing circuit 35. Generally, when comparing phases, the logical sum of the pulses (OR computation) is obtained. When the frequencies are equal, the computation results will indicate a pulse having a duty cycle of 50%. A filter unit 33 at the next stage is constituted by a low-pass filter, which extracts a direct voltage from the pulse obtained by the computation and uses the extracted voltage as a control voltage for controlling the VCXO 34. The circuit is designed to satisfy an equation of control voltage=(power source voltage/2) when the pulse has a duty cycle of 50%. Accordingly, the output frequency from the VCXO 34 is changed according to the variation in the duty cycle, i.e., changed with the direct voltage of the filter unit 33, so as to have the same phase as the input clock.

The PLL method does not involve the procedure of identifying the input clock frequency and adjusting the input clock frequency. Instead, in the PLL method, the phase difference between the input clock and the output frequency from the VCXO 34 is constantly monitored, and the output frequency from the VCXO 34 is adjusted in accordance with the monitored results (frequency is increased or decreased).

Thus, if the control method is inappropriate, many jitter components may be generated. If the PLL method is applied to the frame synchronization method, fluctuations of the transmission path in the IP network correspond to variations in the input clock frequency. Hence, the duty cycle at the phase comparing unit 32 changes significantly and the control voltage (direct voltage) for the VCXO 34 changes sharply, and consequently, jitter components are generated. Furthermore, when the number of samples is increased for the purpose of minimizing fluctuations in the IP transmission path, and more time is taken for the averaging process, the frequency of the VCXO 34 may not be controlled in fine detail. As a result, clock signals with low precision are output.

When the delay varies due to route changes in the IP network, the delay time deviates by 10 msec at a maximum. This means a large variation in the phase when there are no changes in the frequency of the master station. Thus, a large error may occur in the data accumulated by the averaging process, which may erroneously change the clock frequency.

That is, the problem with the frame synchronization method is that fluctuations in the IP transmission path, particularly delay variations caused by route changes, may not be prevented. As a result, the variation amount of the phase is increased and jitter components are increased.

SUMMARY

According to an aspect of the invention, a clock supply device includes a receiving unit configured to receive frame synchronization packets from an asynchronous network and generate timing signals; a phase comparing unit configured to perform phase comparison by comparing phases of the timing signals generated by the receiving unit and clock signals generated by an internal oscillating unit; a phase variation detection unit configured to detect a frequency variation of the frame synchronization packets based on a trend of a variation amount of a phase difference that is obtained by performing a statistical process on count values obtained as a result of the phase comparison; and an oscillating frequency control unit configured to control an oscillating frequency of the internal oscillating unit when the phase variation detection unit detects the frequency variation of the frame synchronization packets.

Additional objects and advantages of the embodiments will be set forth in part in the description which follows, and in part will be obvious from the description, or may be learned by practice of the invention. The object and advantages of the invention will be realized and attained by means of the elements and combinations particularly pointed out in the appended claims. It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings.

First Embodiment

Figure 1:
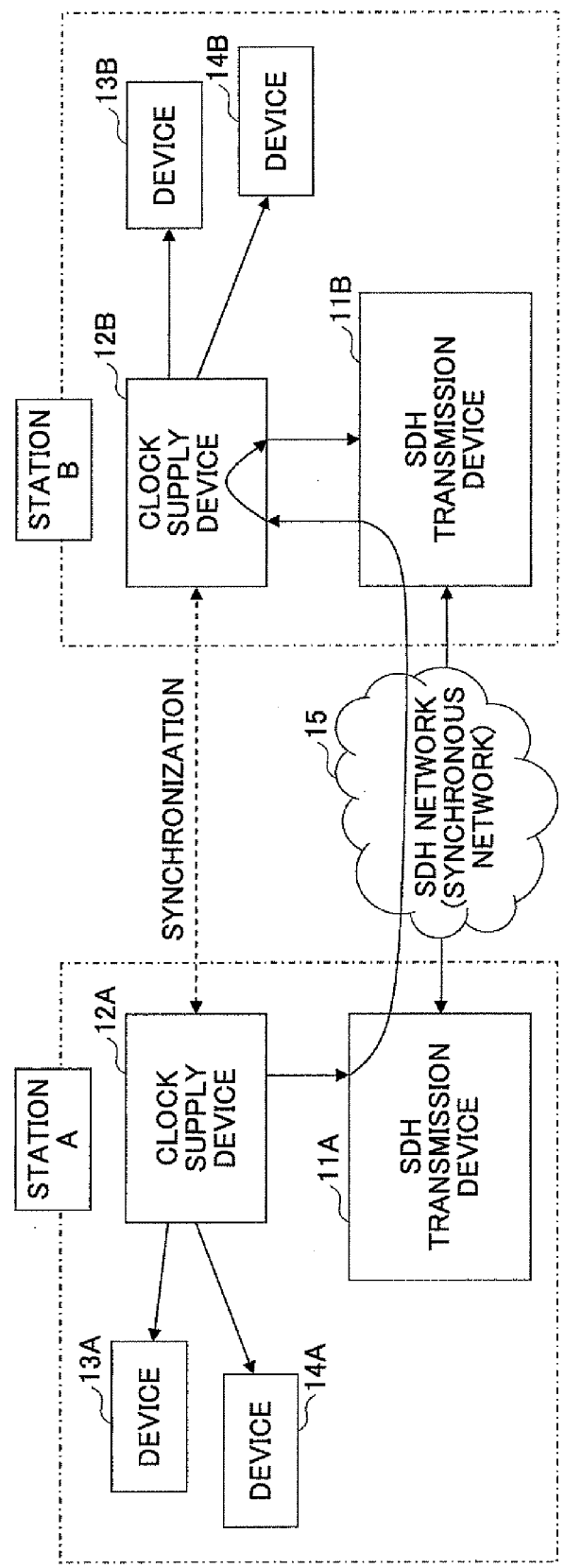
FIG. 1 is for describing an overview of a conventional transmission device and a conventional clock supply device.
Figure 2:
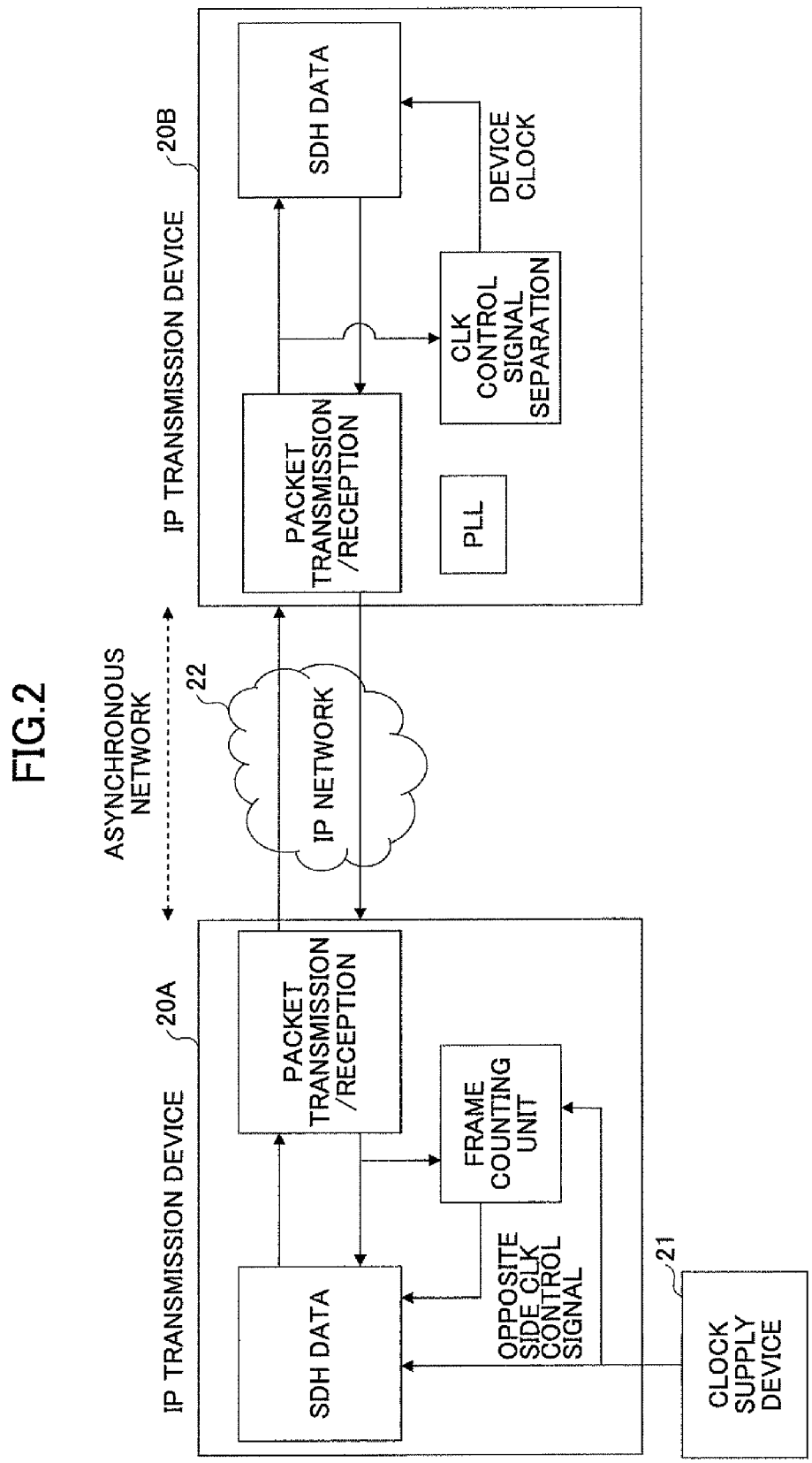
FIG. 2 is for describing an overview of an adaptive synchronization method.
Figure 3:
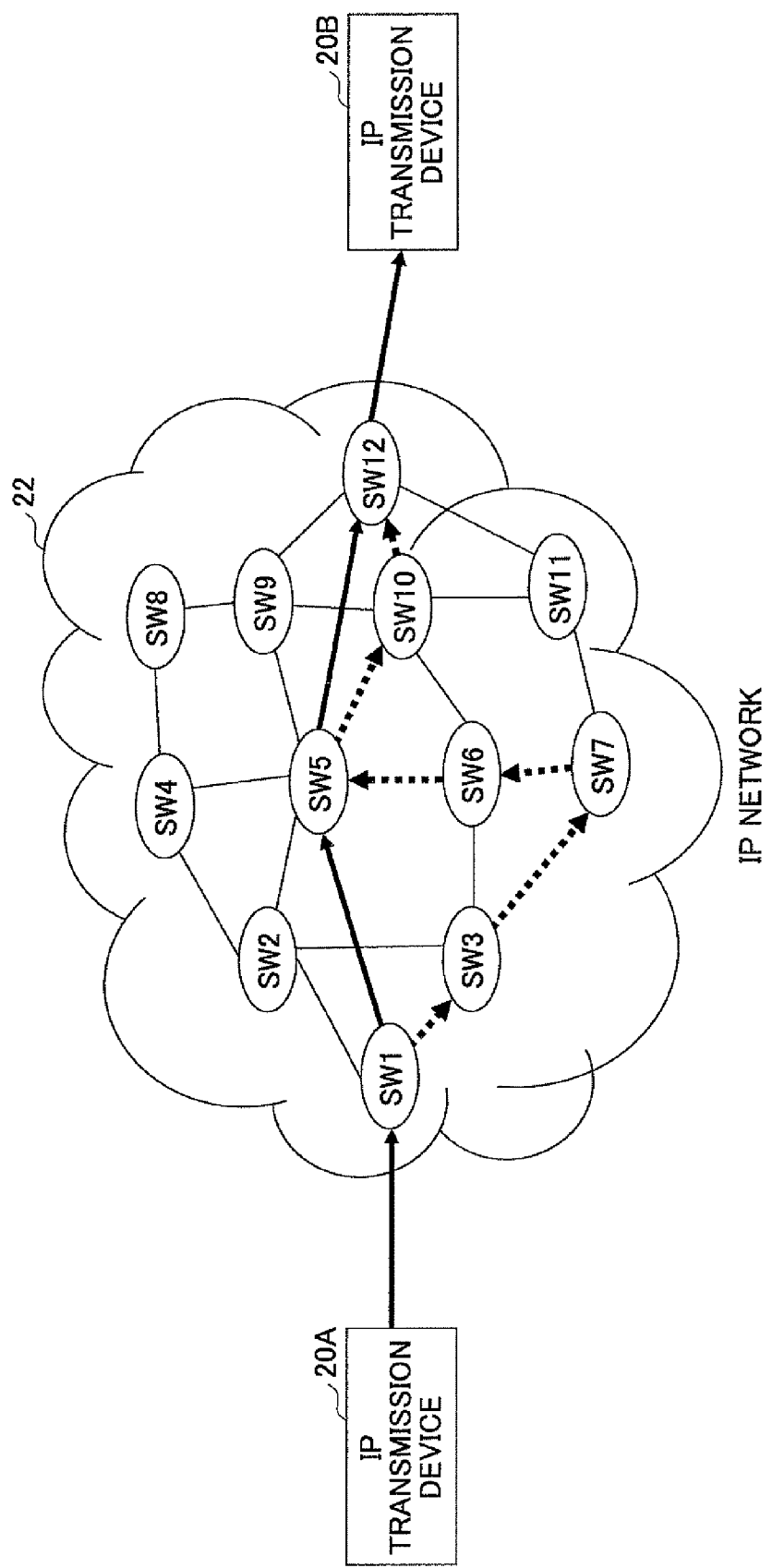
FIG. 3 is a schematic diagram illustrating route changes in an IP network.
Figure 4:
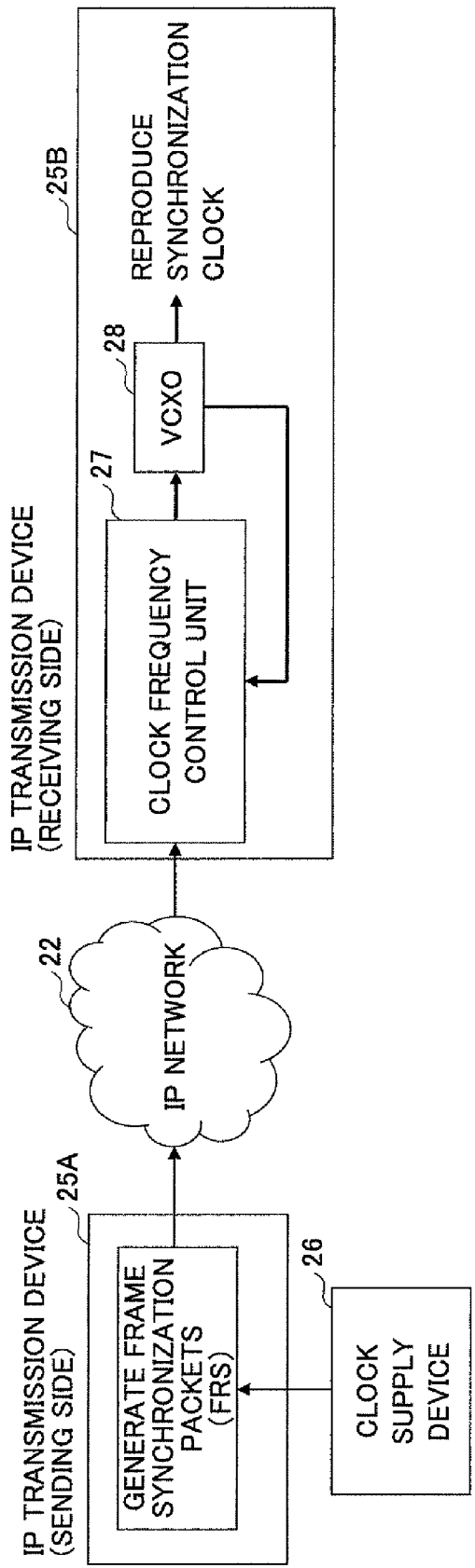
FIG. 4 is for describing an overview of a frame synchronization method.
Figure 5:
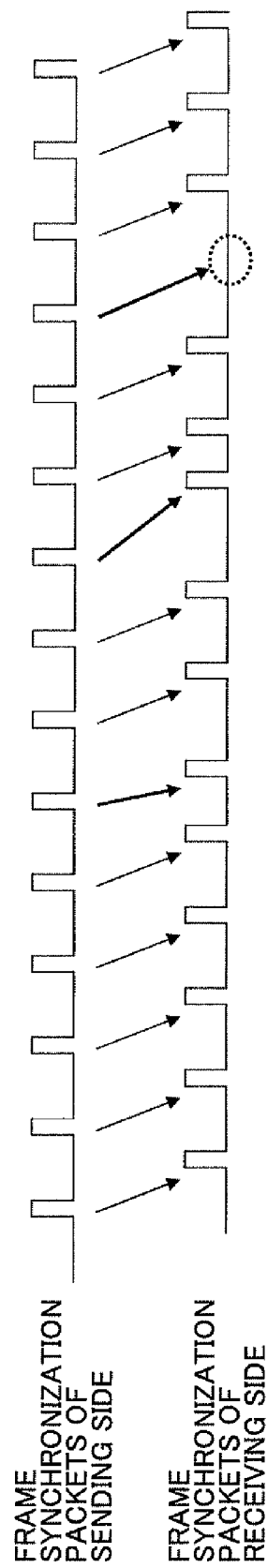
FIG. 5 illustrates fluctuation or packet loss in frame synchronization packets.
Figure 6:
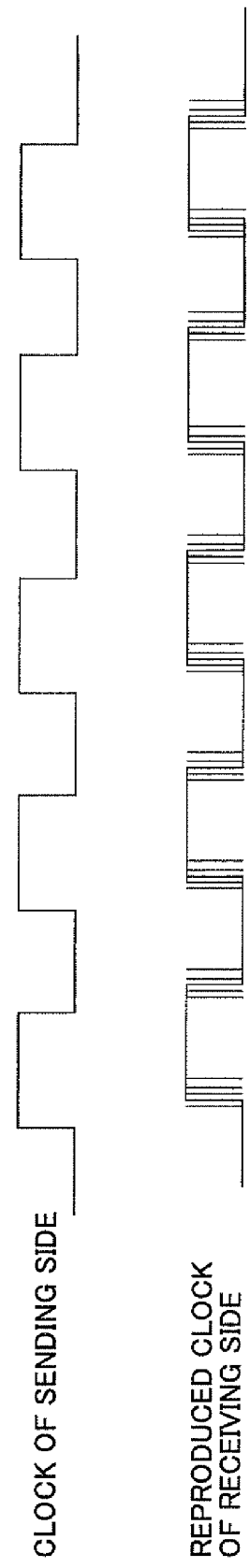
FIG. 6 illustrates changes in the leading edge and the trailing edge of reproduced clock signals on the receiving side.
Figure 7:
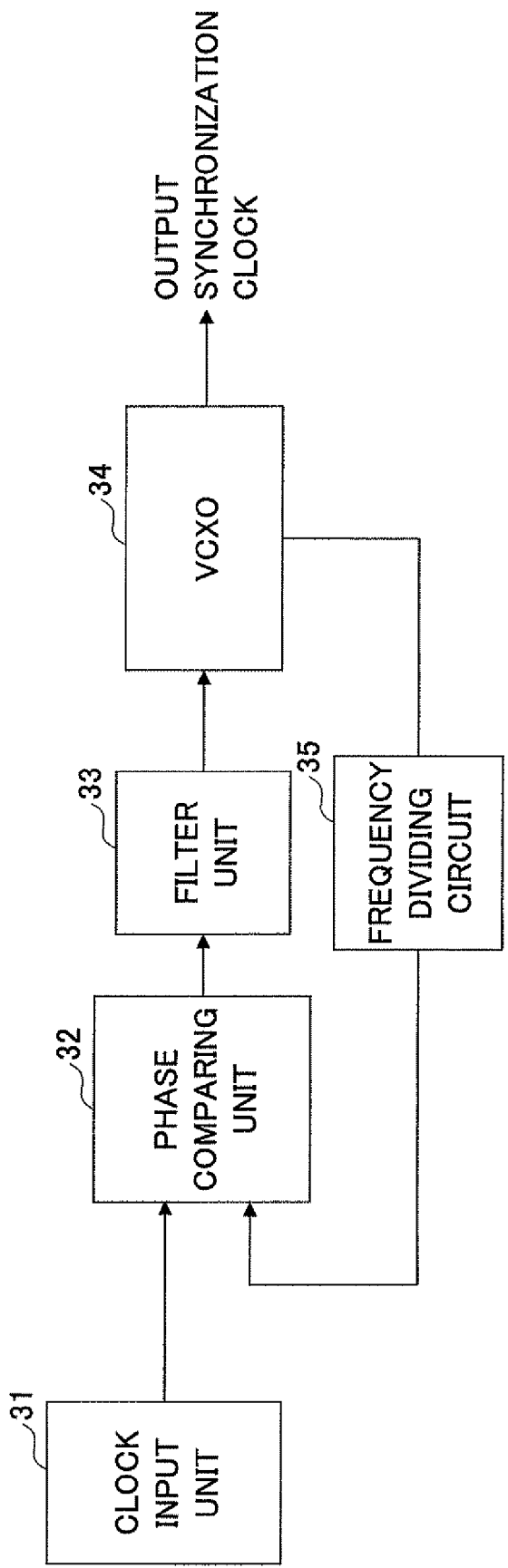
FIG. 7 is a block diagram of PLL.
Figure 8:
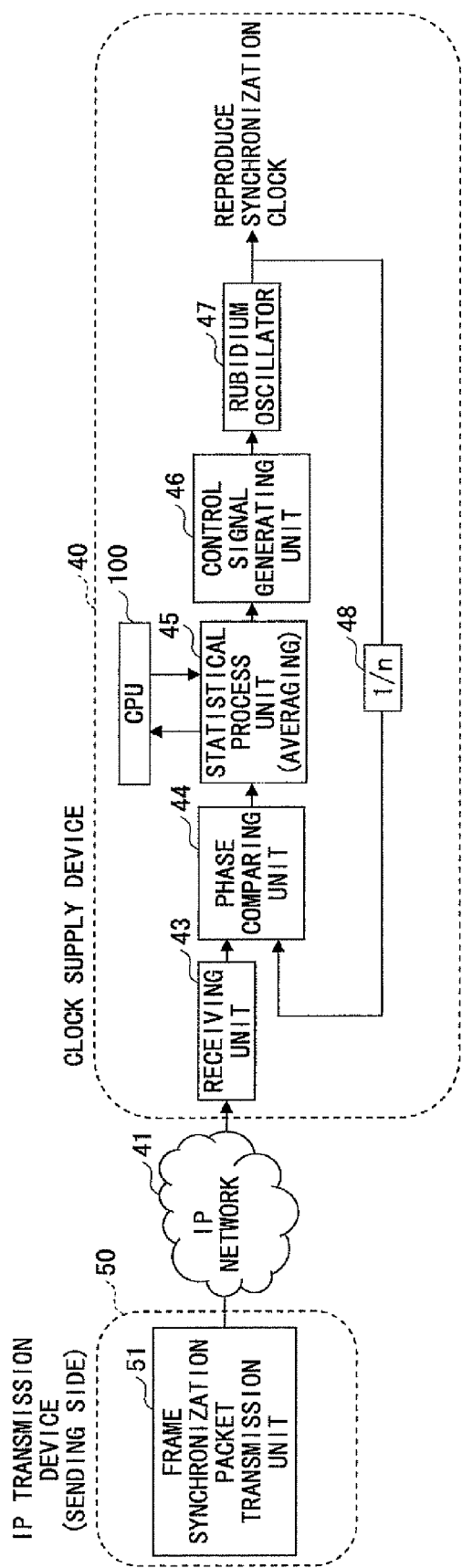
FIG. 8 is a block diagram of a clock supply device according to a first embodiment of the present invention.

FIG. 8 is a block diagram of a clock supply device according to a first embodiment. As illustrated in FIG. 8, a clock supply device 40 includes a receiving unit 43 for receiving frame synchronization packets supplied from an IP network 41 which is an asynchronous network, and generating timing signals of an 8 kHz frequency; a phase comparing unit 44 for comparing timing signals output from the receiving unit 43 with the phase of clock signals obtained by dividing clock signals output from a rubidium oscillator 47 by "n" (or multiplying by 1/n) with a frequency divider 48; a statistical process unit 45 for performing an averaging process based on the phase comparison results by performing a statistical process; a control signal generating unit 46 for generating control signals for the rubidium oscillator 47 based on results of the statistical process; the rubidium oscillator 47 for oscillating based on the control signals; and the frequency divider 48. In this embodiment, a processor (CPU: Central Processing Unit) 100, which controls the overall processes of the parts and units included in the clock supply device 40, is also included in the clock supply device 40. The rubidium oscillator 47 may be any other oscillating unit for generating clock signals. The statistical process unit 45 is connected to the processor 100.

A frame synchronization packet transmission unit 51 of an IP transmission device (sending side) 50 generates frame synchronization packets and sends them to the IP network 41. The frame synchronization packets are regular IP packets that are transmitted at, for example, an 8 kHz frequency.

Figure 9:
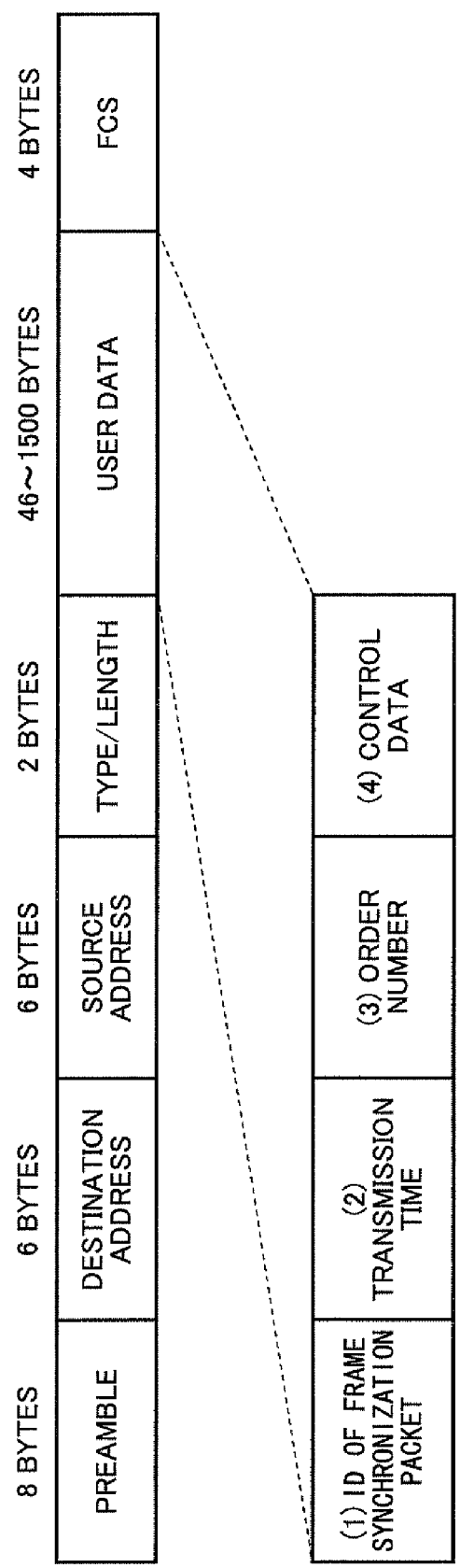
FIG. 9 illustrates a format of a frame synchronization packet according to one embodiment of the present invention.

FIG. 9 illustrates a format of a frame synchronization packet according to one embodiment. As illustrated in FIG. 9, the frame synchronization packet is provided with a preamble, a destination address, a source address, the type/length, user data, and an FCS (Frame Check Sequence) for error correction. The user data includes an ID (identifier) of the frame synchronization packet (1), the transmission time (2), a number representing the order of the frame synchronization packet (3), and control data used for controlling, for example, the transmission periods of the frame synchronization packet (4).

The receiving unit 43 inside the clock supply device 40 receives the frame synchronization packets and generates timing signals of an 8 kHz frequency. The phase comparing unit 44 supplies, to the statistical process unit 45, the result of OR computation performed with timing signals of an 8 kHz frequency and clock signals obtained by dividing clock signals output from the rubidium oscillator 47 by "n" (or multiplying by 1/n) with the frequency divider 48.

Figure 10:
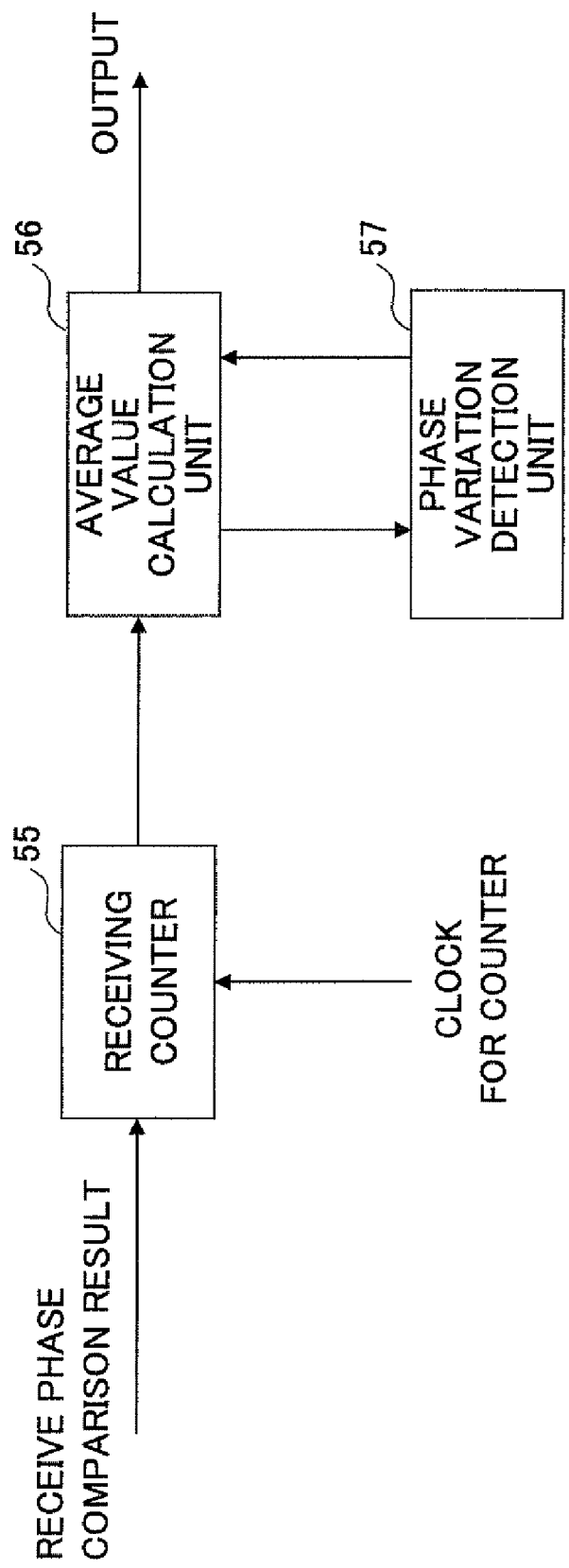
FIG. 10 is a block diagram of a statistical process unit according to one embodiment of the present invention.

FIG. 10 is a block diagram of the statistical process unit 45 according to one embodiment. As illustrated in FIG. 10, a receiving counter 55 counts the period of time (pulse width) during which the phase comparison result (OR computation result) is high-level (or low-level) with the use of, for example, a counter clock of 100 MHz (internal high-speed clock), and supplies the count value (CTn) to an average value calculation unit 56. The average value calculation unit 56 calculates, at every unit time of, for example, 10 seconds, the average value (ACTm) of the count values output from the receiving counter 55 at an 8 kHz frequency, i.e., the average value calculation unit 56 obtains phase difference data. A phase variation detection unit 57 calculates the variation amount (ΔACTm) of the phase difference data. Specifically, the variation amount (ΔACTm) corresponds to the difference between an average value at the previous unit time and an average value at the current unit time.

The control signal generating unit 46 compares the variation amount (ΔACTm) of the phase difference data per unit time with a threshold. When the control signal generating unit 46 detects that the variation amount (ΔACTm) of the phase difference data has changed with respect to the threshold (ΔACTm≧threshold), the control signal generating unit 46 generates control signals for controlling the oscillating frequency of the rubidium oscillator 47 so that the variation amount approaches zero, and supplies the control signals to the rubidium oscillator 47. When the variation amount is below the threshold (ΔACTm<threshold), the oscillating frequency of the rubidium oscillator 47 is fixed at the present frequency.

Figure 11:
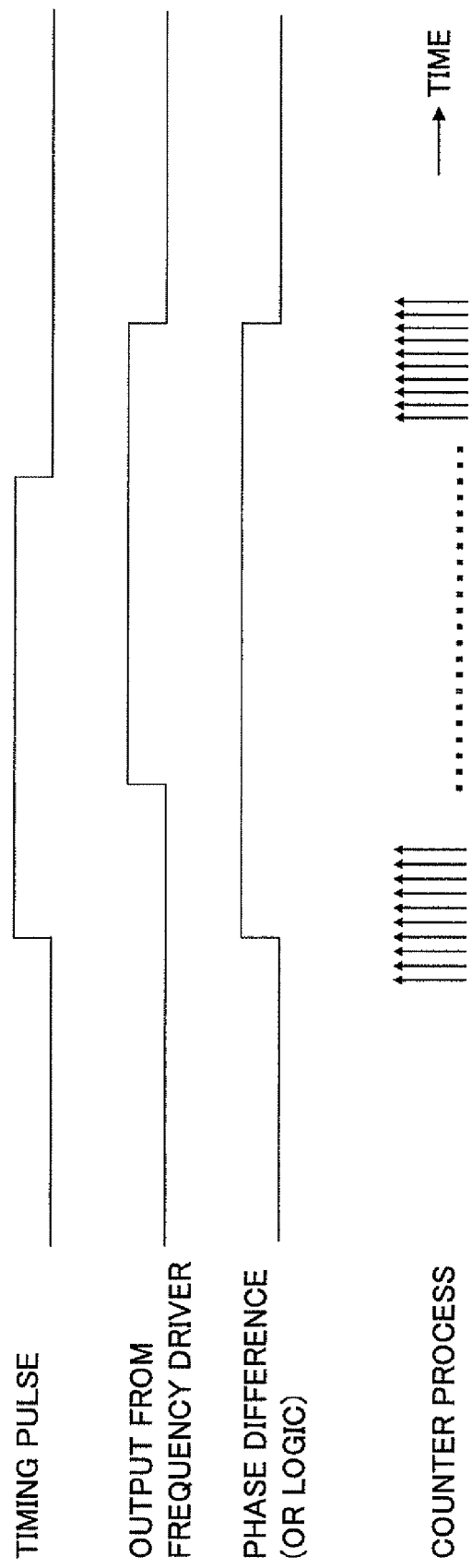
FIG. 11 illustrates signal timing charts of elements illustrated in FIG. 8.

FIG. 11 illustrates signal timing charts of timing signals of an 8 kHz frequency that are output from the receiving unit 43 upon receiving frame synchronization packets, the output from the frequency divider 48, the phase comparison result output from the phase comparing unit 44, and a counter clock.

The count value (CTn) is obtained by counting the phase difference data from the phase comparing unit 44 with the use of a high-speed clock (for example, a clock of 100 MHz). In this case, the counter value may be obtained with a deviation of ±10 nsec. The count value (CTn) is stored as an average value (ACTm) per unit time in the average value calculation unit 56. When the unit time is 10 seconds, the calculation is performed for 8 kHz (125 μsec), and therefore an average value is obtained from 80,000 samples. The variation amount of average values is stored as ΔACTm[=(ACTm−1)−ACTm]. In the above description, "m" and "n" are arbitrary integers representing the order in which the packets are received.

In the initial stage of the synchronization process, the calculated phase difference is anticipated to be large. Thus, the unit time may be reduced to, for example, one second, in order to quickly attain frequency synchronization.

<Detection of Delay Time Variation>

Next, a description is given of the detection of delay time variation by the phase variation detection unit 57, with reference to FIGS. 12 through 15.

Figure 12:
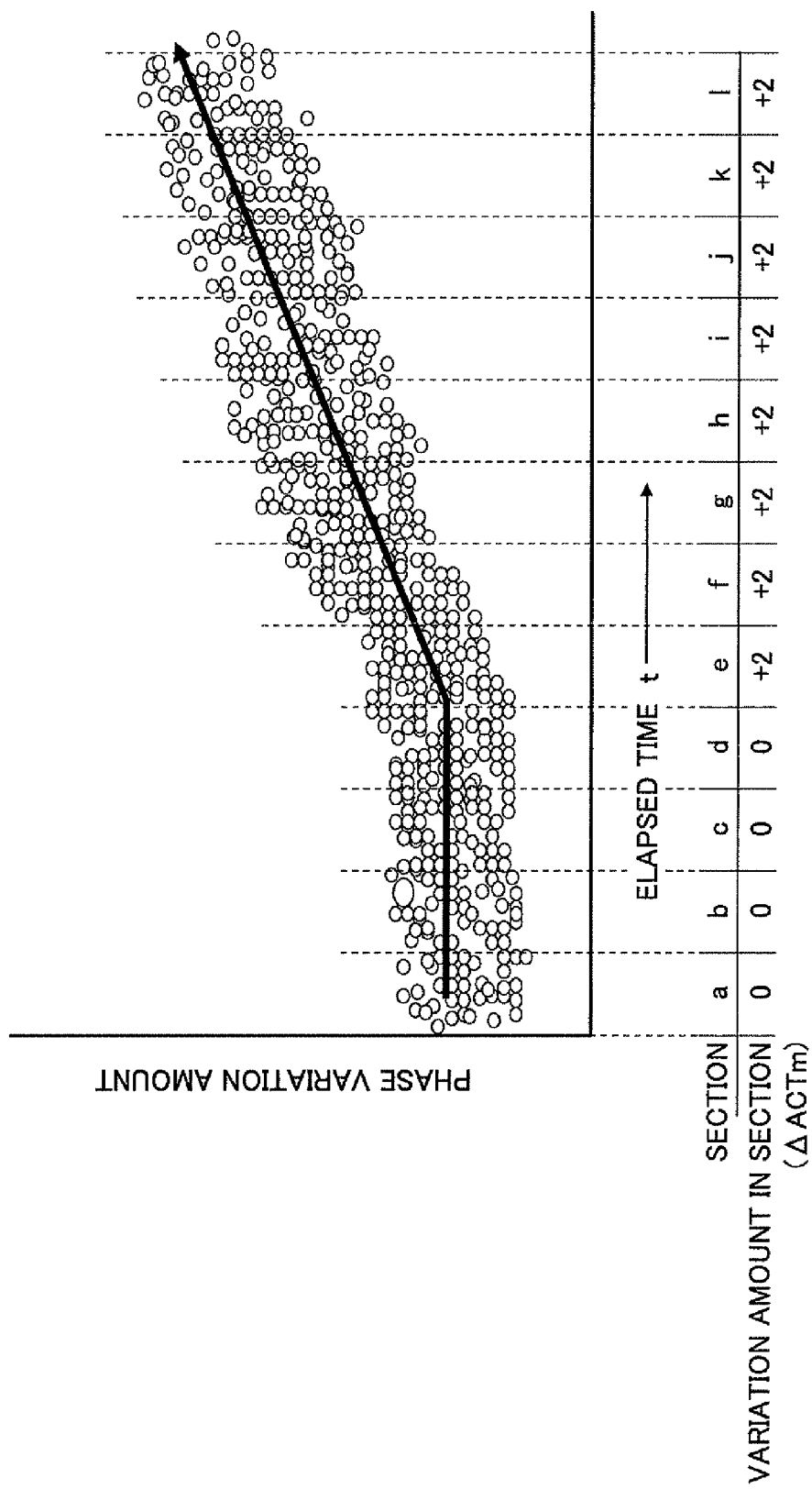
FIG. 12 is a conceptual diagram of phase variation detection when a variation amount continues to increase.
Figure 14:
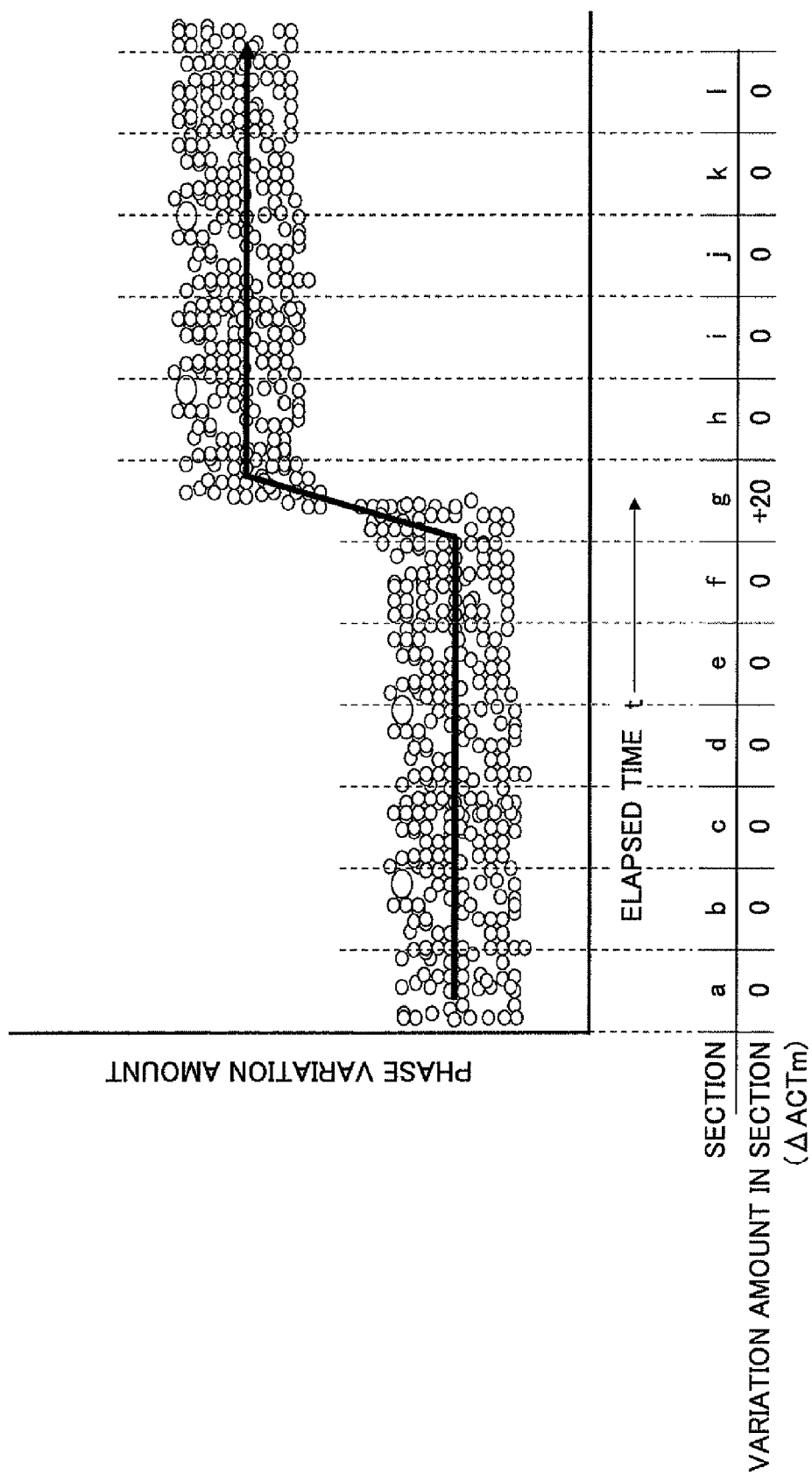
FIG. 14 is a conceptual diagram of phase variation detection when there is a sharp increase in the variation amount.

In FIGS. 12 and 14, the horizontal axis represents the elapsed time t and the vertical axis represents the variation amount (ΔACTm) of the phase difference data. Dots in the figure represent count values (CTn), and the thick solid arrow represents the average values (ACTm).

As illustrated in FIG. 12, section "a" through section "l" represent sections of the unit time, and the variation amount (ΔACTm) starts to increase between section "d" and section "e". The variation amount (ΔACTm) continues to increase between section "e" through section "l", which corresponds to the variation of the master clock frequency in the IP transmission device 50.

Figure 13:
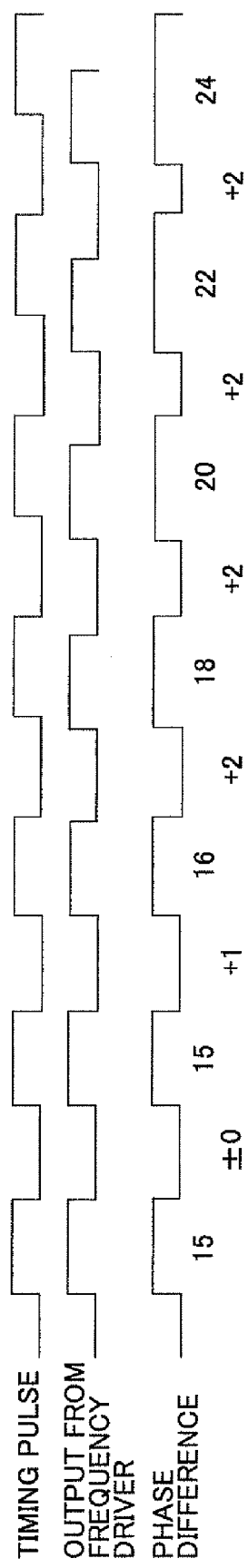
FIG. 13 illustrates signal timing charts when the variation amount continues to increase.

FIG. 13 illustrates signal timing charts when the variation amount (ΔACTm) continues to increase. The timing charts are of timing signals that are output from the receiving unit 43, the output from the frequency divider 48, and the phase comparison result (phase difference) output from the phase comparing unit 44.

Meanwhile, as illustrated in FIG. 14, section "a" through section "l" represent sections of the unit time, and the variation amount (ΔACTm) sharply increases in section "g". The increase of the variation amount (ΔACTm) occurs only in section "g", which means that the delay time has changed due to a change in the route, for example. This means that the master clock frequency in the IP transmission device 50 has not changed.

Figure 15:
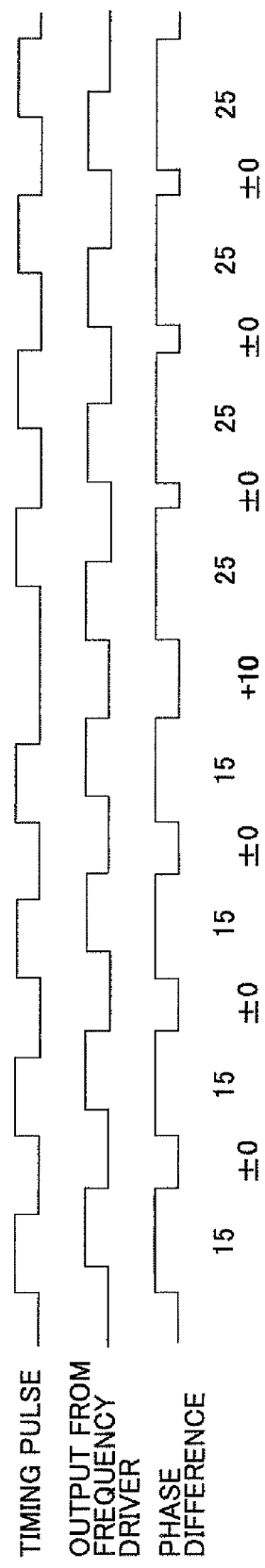
FIG. 15 illustrates signal timing charts when there is a sharp increase in the variation amount.

FIG. 15 illustrates signal timing charts when the variation amount (ΔACTm) increases in only one segment. The timing charts are of timing signals that are output from the receiving unit 43, the output from the frequency divider 48, and the phase comparison result (phase difference) output from the phase comparing unit 44.

The phase variation detection unit 57 detects the difference in the trend of the variation amount between the case of FIG. 12 and the case of FIG. 14. In the case of FIG. 12, the phase variation detection unit 57 detects the increase in the variation amount from section "e" through section "l", and executes an operation for changing the frequency of the rubidium oscillator 47. In the case of FIG. 14, the phase variation detection unit 57 ignores the sharp increase in section "g", and executes an operation for not changing the frequency of the rubidium oscillator 47.

An example of a method performed by the phase variation detection unit 57 for detecting the difference in the variation trend is described as follows. FIG. 12 indicates values representing the variation amount (ΔACTm) between the average value of the previous section and the average value of the current section. A value "0" indicates a case where there is no variation (ΔACTm), and a value "+2" indicates a case where the variation (ΔACTm) is moderate. When the variation between the sections indicates "+2" for three consecutive sections, the phase variation detection unit 57 starts to implement control for changing the frequency of the rubidium oscillator 47.

One example of a specification for controlling the frequency is to set a threshold of "±0.5" and monitor the variation (ΔACTm) at every unit time. While the variation amount (ΔACTm) is within "±0.5", the frequency is stable, and therefore the frequency of the rubidium oscillator 47 is maintained at the present frequency. When the variation amount (ΔACTm) is exceeds the range of "±0.5", the variation (ΔACTm) is monitored in units of three consecutive time units. When the variation (ΔACTm) exceeds ±0.5 for three consecutive time units, the phase variation detection unit 57 detects that there is a variation in the frequency, and controls the frequency of the rubidium oscillator 47.

In FIG. 14, a value "+20" indicates a case where the variation (ΔACTm) is sharp. The variation occurs only in one section, and therefore the phase variation detection unit 57 determines that the difference is caused by a variation in the delay time attributed to a route change, and performs an operation for not changing the frequency of the rubidium oscillator 47.

There are practical examples of a PLL using a rubidium oscillator where the frequency variable width is approximately $10^{-8}$. In such cases, the time period of the averaging process, i.e., the unit time, is extended. If the frequency is changed based on results of an averaging process performed with an insufficient sample, jitter components may increase in the clock signals output from the rubidium oscillator 47.

In a case where the clock of the master station (IP transmission device 50) is a high-precision oscillator such as a cesium oscillator having a frequency deviation of approximately $10^{-12}$, the frequency deviation is low and stable. Therefore, in the averaging process, the average value of transmission path delay is obtained from a large sample, and the clock signals are synchronized with the clock frequency of the master station.

<Statistical Process and Control Process>

Figure 16:
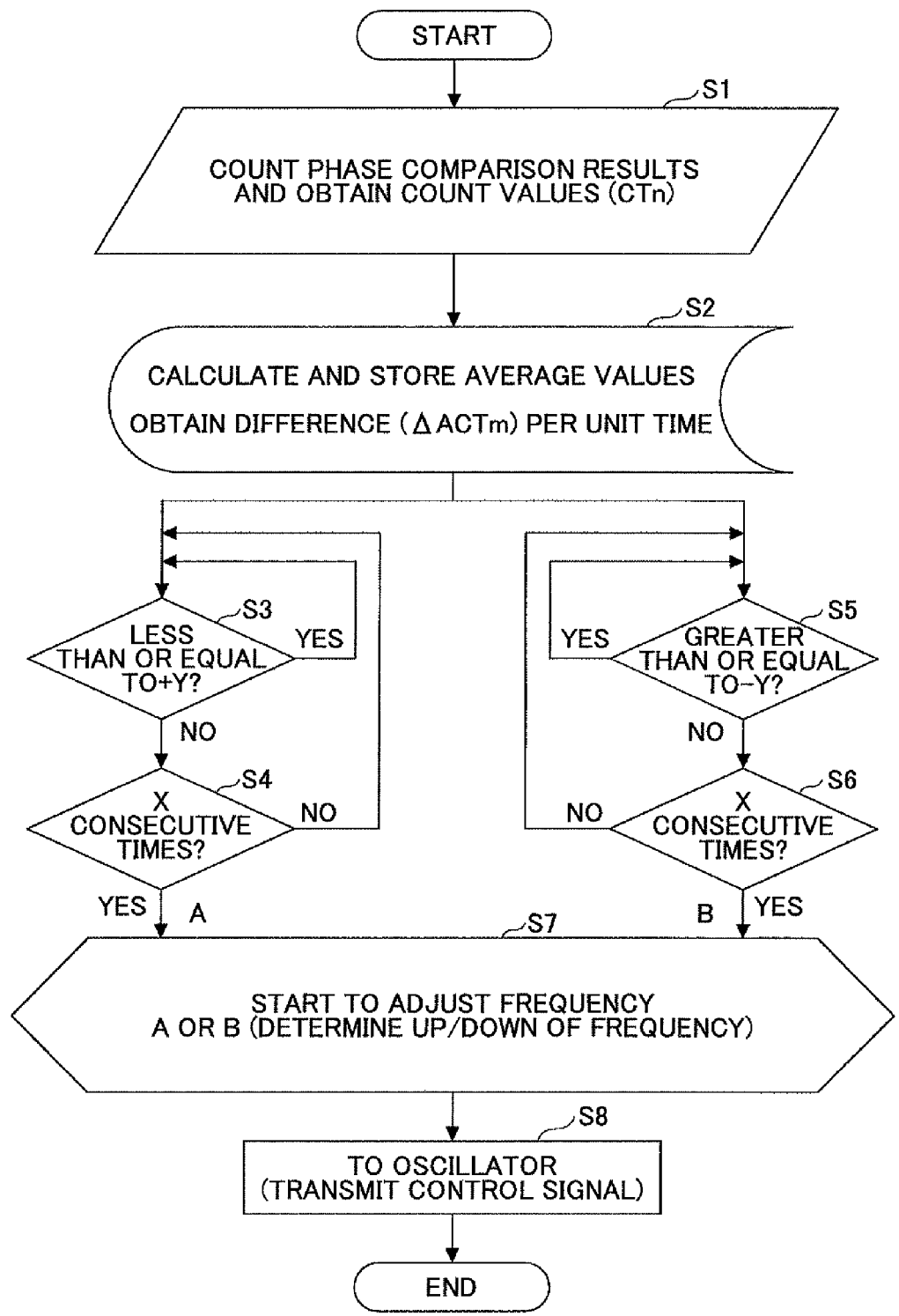
FIG. 16 is a flowchart of a statistical process and a control process.

FIG. 16 is a flowchart of a statistical process and a control process performed by the statistical process unit 45 and the control signal generating unit 46, respectively. The number of determinations X and the threshold Y are set from a higher-level device (not illustrated) such as an NMS (Network Management System). The number of determinations X and the threshold Y may be fixed values.

In step S1, the receiving counter 55 counts the phase comparison results from the phase comparing unit 44 with the use of an internal high-speed clock and obtains count values (CTn).

In step S2, the average value calculation unit 56 obtains, at every unit time, the average value (ACTm) of the count values of an 8 kHz frequency. The phase variation detection unit 57 obtains the variation amount (ΔACTm) of the phase difference data.

Next, in step S3, the control signal generating unit 46 determines whether the variation amount (ΔACTm) is less than or equal to +Y. When the variation amount (ΔACTm) is greater than +Y, in step S4, the control signal generating unit 46 determines whether the variation amount (ΔACTm) has been determined as being greater than +Y for X consecutive times. When the variation amount (ΔACTm) has been determined as being greater than +Y for X consecutive times, the process proceeds to step S7. While performing steps S3 and S4, in step S5, the control signal generating unit 46 determines whether the variation amount (ΔACTm) is greater than or equal to −Y. When the variation amount (ΔACTm) is less than −Y, in step S6, the control signal generating unit 46 determines whether the variation amount (ΔACTm) has been determined as being less than −Y for X consecutive times. When the variation amount (ΔACTm) has been determined as being less than −Y for X consecutive times, the process proceeds to step S7. In the above description, steps S3 and S4 are performed in parallel with steps S5 and S6. However, steps S3 and S4 may be performed after steps S5 and S6, or steps S5 and S6 may be performed after steps S3 and S4.

In step S7, the control signal generating unit 46 generates a control signal for increasing the oscillating frequency of the rubidium oscillator 47 by a predetermined amount when the variation amount (ΔACTm) is greater than +Y. The control signal generating unit 46 generates a control signal for decreasing the oscillating frequency of the rubidium oscillator 47 by a predetermined amount when the variation amount (ΔACTm) is less than −Y.

In step S8, the control signal generating unit 46 supplies the generated control signals to the rubidium oscillator 47. Accordingly, the oscillating frequency of the rubidium oscillator 47 is changed.

In the present embodiment, even when there are variations in the delay due to route changes of the IP network transmission path, the oscillation frequency of the rubidium oscillator 47 is not changed. Therefore, jitter of the clock signals, which is caused by variations in the delay due to route changes, may be mitigated. Furthermore, by using the rubidium oscillator 47 that outputs a stable frequency deviation, it is possible to output clock signals that are unaffected by fluctuations and packet losses in the IP network transmission path.

Second Embodiment

Figure 17:
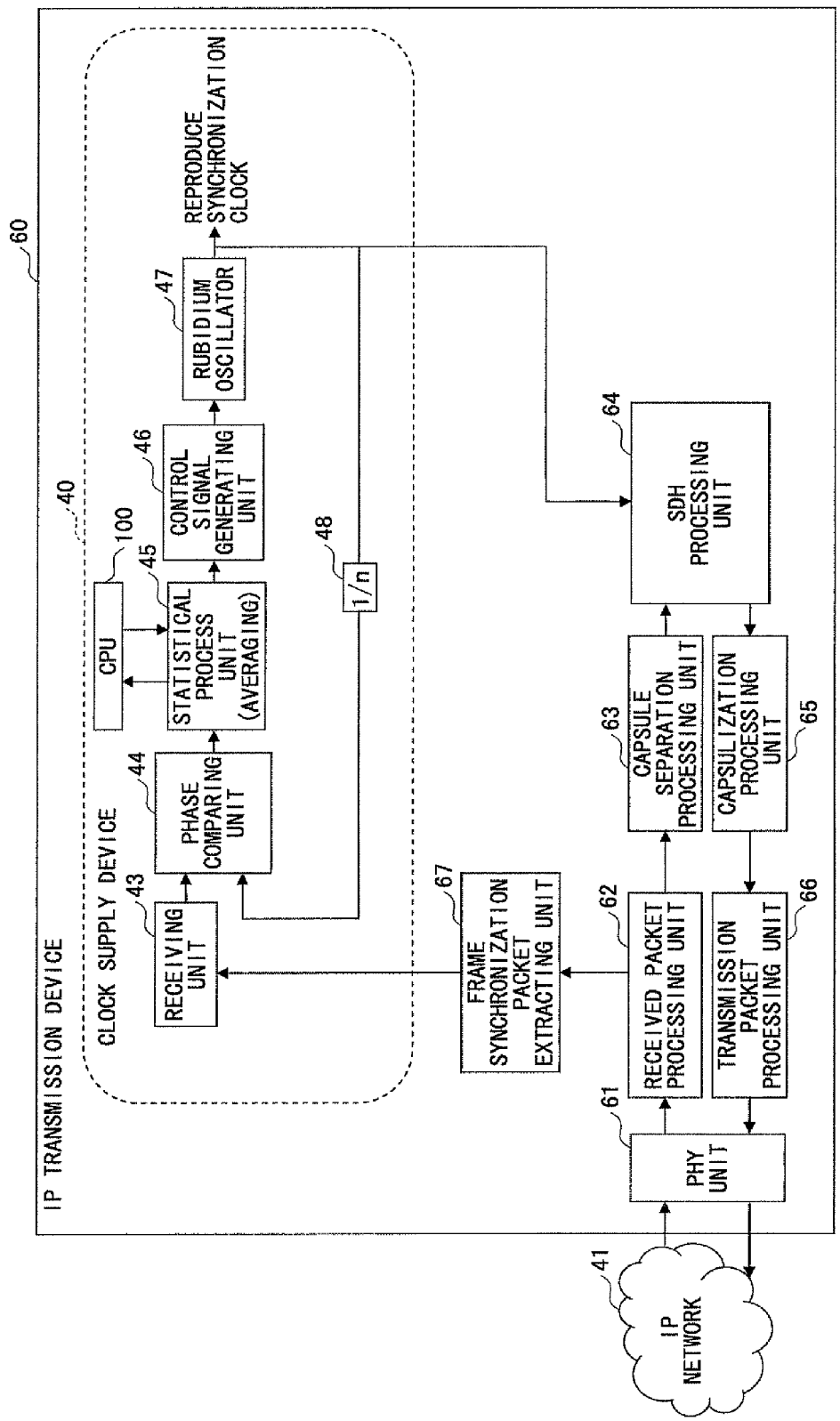
FIG. 17 is a block diagram of an IP transmission device using a clock supply device according to a second embodiment of the present invention.

FIG. 17 is a block diagram of an IP transmission device using a clock supply device according to a second embodiment. As illustrated in FIG. 17, a PHY unit 61 inside an IP transmission device 60 transmits and receives transmission signals such as Ethernet (registered trademark) signals through the IP network 41. A received packet processing unit 62 confirms the information of the received packet. A capsule separation processing unit 63 disassembles the received packets and extracts SDH (synchronous digital hierarchy) data. An SDH processing unit 64 processes the SDH data. A capsulization processing unit 65 capsulizes the SDH data to form transmission packets. A transmission packet processing unit 66 performs a transmission process on the transmission packets and supplies the transmission packets to the PHY unit 61.

A frame synchronization packet extracting unit 67 extracts frame synchronization packets from the received packets supplied from the received packet processing unit 62, and supplies the frame synchronization packets to the clock supply device 40.

The clock supply device 40 has the same configuration as that illustrated in FIG. 8. The clock supply device 40 includes the receiving unit 43 for receiving frame synchronization packets supplied from the frame synchronization packet extracting unit 67 and generating timing signals of an 8 kHz frequency; the phase comparing unit 44 for comparing timing signals output from the receiving unit 43 with the phase of clock signals obtained by dividing clock signals output from the rubidium oscillator 47 by "n" (or multiplying by 1/n) with the frequency divider 48; the statistical process unit 45 for performing an averaging process based on the phase comparison results by performing a statistical process; the control signal generating unit 46 for generating control signals for the rubidium oscillator 47 based on results of the statistical process; the rubidium oscillator 47 for oscillating based on the control signals; and the frequency divider 48. In this embodiment, the processor (CPU: Central Processing Unit) 100, which controls the overall processes of the parts and units included in the clock supply device 40, is also included in the clock supply device 40. The statistical process unit 45 is connected to the processor 100.

In the present embodiment, the clock supply device 40 is provided inside the IP transmission device 60. That is, while transmitting/receiving IP data, the transmission device 60 periodically (8 kHz, 125 μsec frequency) receives frame synchronization packets. The frame synchronization packet extracting unit 67 extracts the frame synchronization packets, and the clock supply device 40 reproduces synchronization clock signals. Then, the synchronization clock signals are supplied to, for example, the SDH processing unit 64 inside the IP transmission device 60.

Third Embodiment

In a clock supply device according to a third embodiment, the phase comparing unit included in the first embodiment is excluded. The frequency of received frame synchronization packets is directly counted with the use of the clock signals output from the rubidium oscillator 74, and a statistical process is performed on the average value of the count value.

Figure 18:
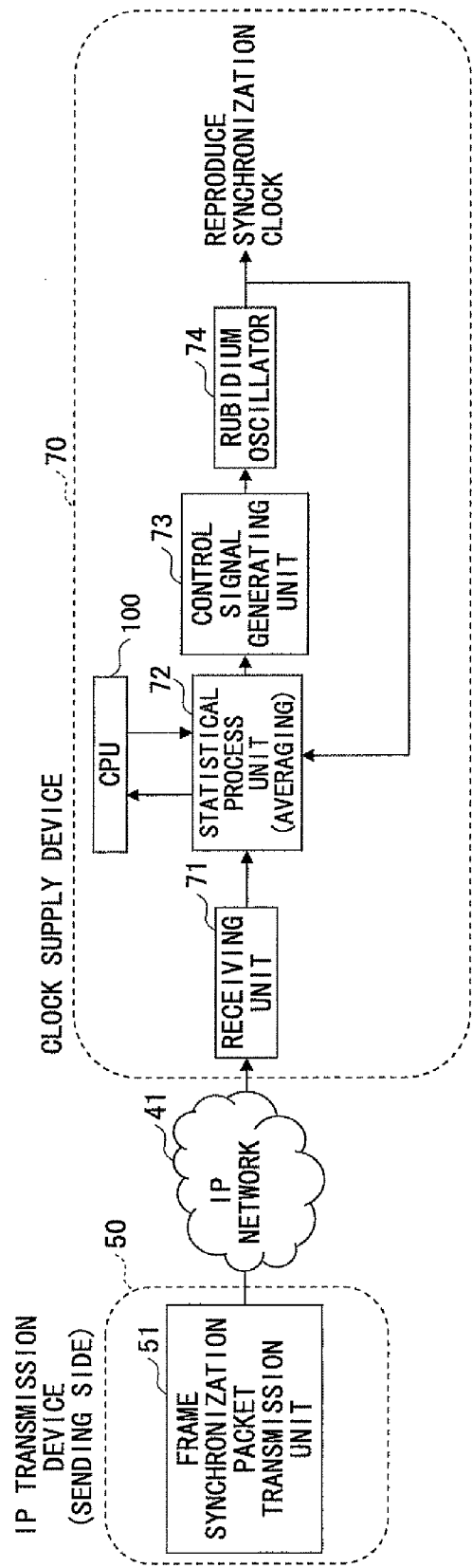
FIG. 18 is a block diagram of a clock supply device according to the third embodiment of the present invention.

FIG. 18 is a block diagram of a clock supply device according to the third embodiment. As illustrated in FIG. 18, a clock supply device 70 includes a receiving unit 71 for receiving frame synchronization packets supplied from the IP network 41, and generating timing signals of an 8 kHz frequency; a statistical process unit 72 for counting the timing signals output from the receiving unit 71 with the use of clock signals output from a rubidium oscillator 74 and performing an averaging process on the count values; a control signal generating unit 73 for generating control signals for the rubidium oscillator 74 based on results of the statistical process; and the rubidium oscillator 74 for oscillating based on the control signals. In this embodiment, the processor (CPU: Central Processing Unit) 100, which controls the overall processes of the parts and units included in the clock supply device 70, is also included in the clock supply device 70. The statistical process unit 72 is connected to the processor 100.

The frame synchronization packet transmission unit 51 of the IP transmission device (sending side) 50 generates frame synchronization packets and transmits the frame synchronization packets to the IP network 41. The frame synchronization packets are regular IP packets that are transmitted at, for example, an 8 kHz frequency.

Figure 19:
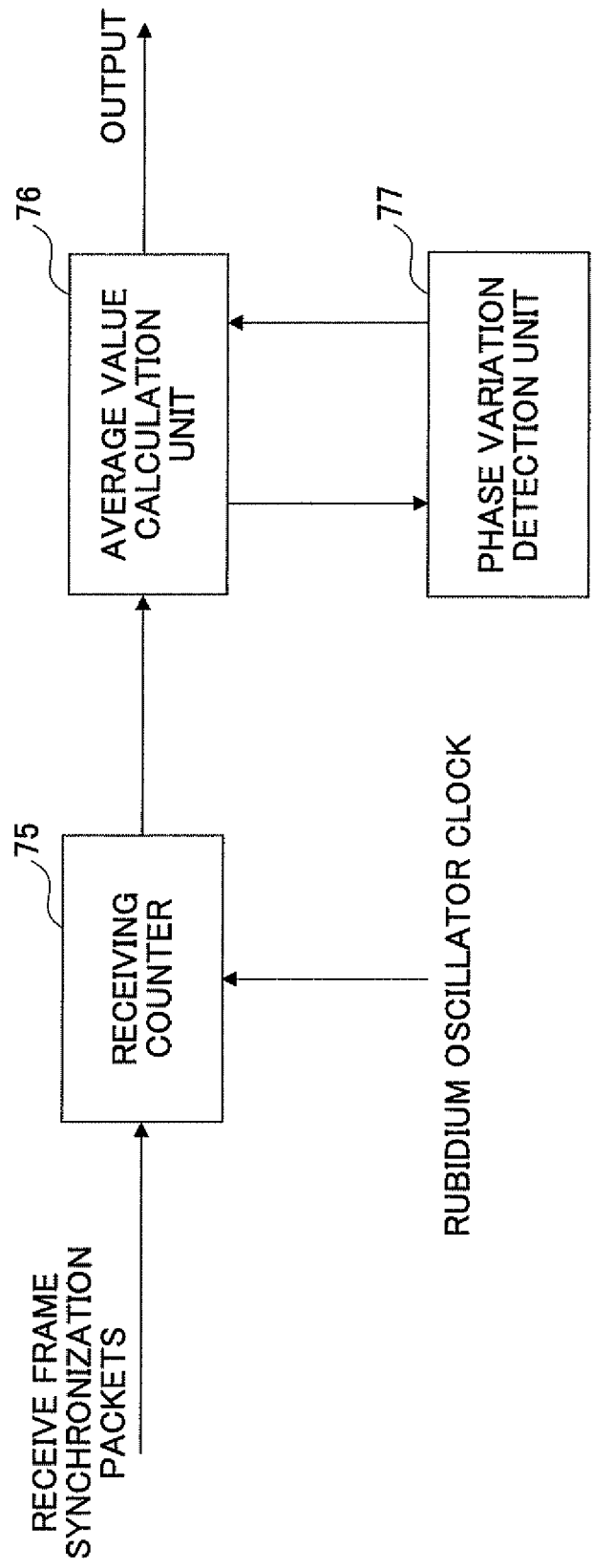
FIG. 19 is a block diagram of a statistical process unit according to one embodiment of the present invention.

FIG. 19 is a block diagram of the statistical process unit 72 according to one embodiment. As illustrated in FIG. 19, a receiving counter 75 is supplied with timing signals of an 8 kHz frequency that are generated as the receiving unit 71 receives the frame synchronization packets. The receiving counter 75 counts the timing signals of an 8 kHz frequency with the use of clock signals output from the rubidium oscillator 74, and supplies the count values (CTn) to an average value calculation unit 76. The average value calculation unit 76 calculates, at every unit time of, for example, 10 seconds, the average value (ACTm) of the count values output from the receiving counter 75 at an 8 kHz frequency. A phase variation detection unit 77 calculates the variation amount (ΔACTm) of the frame period. Specifically, the variation amount (ΔACTm) corresponds to the difference between an average value at the previous unit time and an average value at the current unit time.

The control signal generating unit 73 compares the variation amount (ΔACTm) of the frame period per unit time with a threshold. When the control signal generating unit 73 detects that the variation amount (ΔACTm) of the frame period has changed with respect to the threshold (ΔACTm≧threshold), the control signal generating unit 73 generates control signals for controlling the oscillating frequency of the rubidium oscillator 74 so that the variation amount approaches zero, and supplies the control signals to the rubidium oscillator 74. When the variation amount is below the threshold (ΔACTm<threshold), the oscillating frequency of the rubidium oscillator 74 is fixed at the present frequency.

Fourth Embodiment

Figure 20:
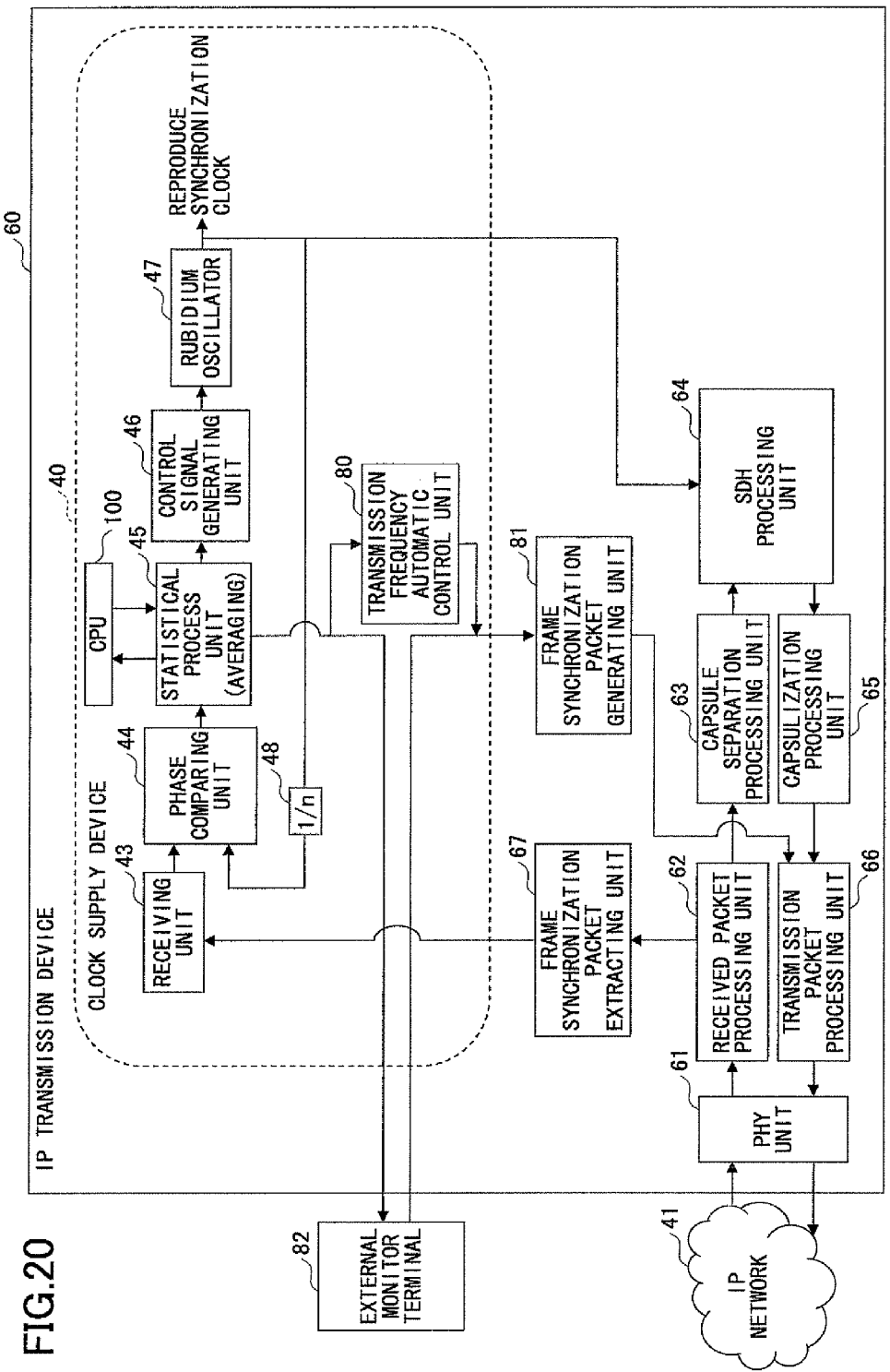
FIG. 20 is a block diagram of an IP transmission device using a clock supply device according to a fourth embodiment.

FIG. 20 is a block diagram of an IP transmission device using a clock supply device according to a fourth embodiment. In FIG. 20, elements corresponding to those in FIG. 17 are denoted by the same reference numerals. The PHY unit 61 inside the IP transmission device 60 transmits and receives transmission signals such as Ethernet (registered trademark) signals through the IP network 41, and performs physical layer processing. The received packet processing unit 62 confirms the information of the received packet. The capsule separation processing unit 63 disassembles the received packets and extracts SDH data. The SDH processing unit 64 processes the SDH data. The capsulization processing unit 65 capsulizes the SDH data to form transmission packets. The transmission packet processing unit 66 performs a transmission process on the transmission packets and supplies the transmission packets to the PHY unit 61.

The frame synchronization packet extracting unit 67 extracts frame synchronization packets from the received packets supplied from the received packet processing unit 62, and supplies the frame synchronization packets to the clock supply device 40.

The clock supply device 40 has the same configuration as that illustrated in FIG. 8. The clock supply device 40 includes the receiving unit 43 for receiving frame synchronization packets supplied from the frame synchronization packet extracting unit 67 and generating timing signals of an 8 kHz frequency; the phase comparing unit 44 for comparing timing signals output from the receiving unit 43 with the phase of clock signals obtained by dividing clock signals output from the rubidium oscillator 47 by "n" (or multiplying by 1/n) with the frequency divider 48; the statistical process unit 45 for performing an averaging process based on the phase comparison results by performing a statistical process; the control signal generating unit 46 for generating control signals for the rubidium oscillator 47 based on results of the statistical process; the rubidium oscillator 47 for oscillating based on the control signals; and the frequency divider 48. In this embodiment, the processor (CPU: Central Processing Unit) 100, which controls the overall processes of the parts and units included in the clock supply device 40, is also included in the clock supply device 40. The statistical process unit 45 is connected to the processor 100.

In the present embodiment, the variation amount (ΔACTm) of the phase difference data obtained at the statistical process unit 45 is supplied to a transmission frequency automatic control unit 80. The transmission frequency automatic control unit 80 requests a frame synchronization packet generating unit 81 to extend the transmission frequency in a case where the variation amount (ΔACTm) is stable for a predetermined period of time of, for example, several to ten minutes.

When the request to extend the transmission frequency is received, the frame synchronization packet generating unit 81 sets, in the control data of the frame synchronization packet illustrated in FIG. 9, control information for requesting to extend the transmission frequency of the frame synchronization packets; generates the frame synchronization packet; and supplies the frame synchronization packet to the transmission packet processing unit 66. The frame synchronization packet for requesting to extend the transmission frequency of the frame synchronization packets is transmitted to the IP transmission device on the sending side. Accordingly, in response to the frame synchronization packet for requesting to extend the transmission frequency of the frame synchronization packets, the IP transmission device on the sending side extends the transmission frequency of the frame synchronization packets from an 8 kHz frequency to, for example 80 Hz.

The request to extend the transmission frequency may be manually given to the frame synchronization packet generating unit 81. Specifically, the variation amount (ΔACTm) of the phase difference data obtained at the statistical process unit 45 may be supplied to an external monitor terminal 82 to be displayed to a maintenance person. The maintenance person may confirm that the variation amount (ΔACTm) is stable, and make the request for the extension.

As described above, the clock signals, which are in synchronization with a clock supply device having a master clock, may be supplied via an asynchronous network such as an IP network to synchronize SDH networks that are connected to each other via the IP network, thus providing a flexible operation configuration. In the conventional technology, stations are connected via an SDH network to attain network synchronization among SDH devices in the stations. However, even if the interface between the stations is an IP network, network synchronization may be attained with the use of the clock supply device according to an embodiment of the present invention.

The clock supply device 70 illustrated in FIG. 18 may be used in FIGS. 17 and 20 instead of the clock supply device 40.

According to an embodiment of the present invention, jitter of the clock signals, which is caused by variations in the delay due to route changes, may be mitigated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A clock supply device comprising:
   a receiving unit configured to receive frame synchronization packets from an asynchronous network and generate timing signals;
   a phase comparing unit configured to perform phase comparison by comparing phases of the timing signals generated by the receiving unit and clock signals generated by an internal oscillating unit;

an average value calculation unit configured to calculate, at every unit time, an average value of count values obtained as a result of the phase comparison;

a phase variation detection unit configured to calculate a difference between the average value at previous unit time and the average value at current unit time to obtain a variation amount of a phase difference and detect a frequency variation of the frame synchronization packets based on the obtained variation amount of the phase difference; and an oscillating frequency control unit configured to control an oscillating frequency of the internal oscillating unit when the phase variation detection unit detects the frequency variation of the frame synchronization packets.

2. The clock supply device according to claim 1, wherein the internal oscillating unit is a rubidium oscillator.

3. A transmission device for extracting synchronization network data from packets received from an asynchronous network, performing data processing on the extracted synchronization network data, packetizing the synchronization network data that has undergone the data processing, and transmitting the packetized synchronization network data to the asynchronous network, the transmission device comprising:

a clock supply device including a receiving unit configured to receive frame synchronization packets from the asynchronous network and generate timing signals, a phase comparing unit configured to perform phase comparison by comparing phases of the timing signals generated by the receiving unit and clock signals generated by an internal oscillating unit, an average value calculation unit configured to calculate, at every unit time, an average value of count values obtained as a result of the phase comparison, a phase variation detection unit configured to calculate a difference between the average value at previous unit time and the average value at current unit time to obtain a variation amount of a phase difference and detect a frequency variation of the frame synchronization packets based on the obtained variation amount of the phase difference, and an oscillating frequency control unit configured to control an oscillating frequency of the internal oscillating unit when the phase variation detection unit detects the frequency variation of the frame synchronization packets; and a processing unit configured to perform the data processing with the use of the clock signals generated by the internal oscillating unit of the clock supply device.

4. The transmission device according to claim 3, further comprising:

a requesting unit configured to request extension of a transmission frequency when the variation amount is stable; and a packet generating unit configured to generate a frame synchronization packet in which information requesting the extension of the transmission frequency is set, and transmit the generated frame synchronization packet to the asynchronous network.

5. A clock supply device comprising:

a receiving unit configured to receive frame synchronization packets from an asynchronous network and generate timing signals;

a counting unit configured to count the timing signals generated by the receiving unit with the use of clock signals generated by an internal oscillating unit;

an average value calculation unit configured to calculate, at every unit time, an average value of count values obtained by the counting unit;

a phase variation detection unit configured to calculate a difference between the average value at previous unit time and the average value at current unit time to obtain a variation amount of a frame period and detect a frequency variation of the frame synchronization packets based on the obtained variation amount of the frame period; and an oscillating frequency control unit configured to control an oscillating frequency of the internal oscillating unit when the phase variation detection unit detects the frequency variation of the frame synchronization packets.

6. The clock supply device according to claim 5, wherein the internal oscillating unit is a rubidium oscillator.

* * * * *